(12) United States Patent
Furuta

(10) Patent No.: US 8,149,341 B2
(45) Date of Patent: Apr. 3, 2012

(54) LCD APPARATUS

(75) Inventor: Yoshihiro Furuta, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 325 days.

(21) Appl. No.: 12/102,364

(22) Filed: Apr. 14, 2008

(65) Prior Publication Data

US 2008/0252801 A1    Oct. 16, 2008

(30) Foreign Application Priority Data

Apr. 16, 2007 (JP) ................................ 2007-106993

(51) Int. Cl.
*G02F 1/1335* (2006.01)
(52) U.S. Cl. .............................................. 349/9; 349/96
(58) Field of Classification Search .................... 349/5–9
See application file for complete search history.

(56) References Cited

U.S. PATENT DOCUMENTS

| | | | |
|---|---|---|---|
| 6,669,343 B2 * | 12/2003 | Shahzad et al. | 353/20 |
| 6,669,865 B1 * | 12/2003 | Coates et al. | 252/299.01 |
| 6,888,659 B2 * | 5/2005 | Allard | 359/246 |
| 7,057,681 B2 * | 6/2006 | Hinata et al. | 349/96 |
| 7,170,679 B2 * | 1/2007 | Bievenour et al. | 359/498 |
| 2004/0109233 A1 * | 6/2004 | Allard | 359/484 |
| 2005/0237489 A1 * | 10/2005 | Nakashima et al. | 353/20 |
| 2006/0181771 A1 * | 8/2006 | Taira | 359/494 |
| 2007/0013872 A1 * | 1/2007 | Kanayama et al. | 353/20 |
| 2008/0316396 A1 * | 12/2008 | Horikoshi et al. | 349/96 |
| 2009/0244412 A1 * | 10/2009 | Tsukagoshi | 349/8 |

FOREIGN PATENT DOCUMENTS

| | | |
|---|---|---|
| CN | 1727986 A | 2/2006 |
| JP | 2000-356770 A | 12/2000 |
| JP | 2006-039087 A | 2/2006 |
| JP | 2006-072149 A | 3/2006 |

OTHER PUBLICATIONS

Chinese Office Action, Application No. 200810092592.9, dated Jul. 10, 2009.

* cited by examiner

*Primary Examiner* — Eric Wong
(74) *Attorney, Agent, or Firm* — Westerman, Hattori, Daniels & Adrian, LLP; William F. Westerman

(57) ABSTRACT

An LCD panel (214) is provided on the light-incidence side thereof with a reflective polarizer. An optical compensator (213) is provided between a reflective polarizer (211) and the LCD panel (214) to reduce birefringence that takes place in the liquid crystal of the LCD panel (214). A further absorptive polarizer (212) is provided between a reflective polarizer (211) and the optical compensator (213). The reflective polarizer (211) and the absorptive polarizer (212) are arranged so that their transmission axes coincide to each other. Thus, the absorptive polarizer and optical compensator together cooperate to compensate for the deficient polarization degree of the reflective polarizer to improve the contrast of a displayed image. The absorptive polarizer absorbs unwanted catoptric light. The optical compensator removes irregularity in the blackness of the LCD panel that would otherwise appear in the black display screen. Thus, degradation of picture quality of a displayed image caused by unwanted catoptric light undergoing multiple reflections in the LCD panel can be eliminated by the absorptive polarizer in collaboration with the optical compensator.

7 Claims, 4 Drawing Sheets

FIG.3

| | REFLECTIVE POLARIZER (EXTINCTION RATIO 30:1) | ABSORPTIVE POLARIZER (EXTINCTION RATIO 6000:1) | ABSORPTIVE POLARIZER (EXTINCTION RATIO 20:1) | OPTICAL COMPENSATOR | SURFACE TEMPERATURE (INORGANIC) | SURFACE TEMPERATURE (ORGANIC) | CONTRAST RATIO (1500:1) | NO-BURNING TIME |
|---|---|---|---|---|---|---|---|---|
| ① | × | ○ | × | × | — | 71°C | 900:1 | About 3000 Hrs |
| ② | × | ○ | × | ○ | — | 70°C | 2000:1 | About 3000 Hrs |
| ③ | ○ | × | × | × | 78°C | — | 760:1 | More than 10000 hrs |
| ④ | ○ | × | × | ○ | 78°C | — | 1160:1 | More than 10000 hrs |
| ⑤ | ○ | ○ | × | × | 79°C | 55°C | 1200:1 | About 7500 Hrs |
| ⑥ | ○ | ○ | × | ○ | 80°C | 61°C | 2000:1 | About 5000 Hrs |
| ⑦ | ○ | × | ○ | × | 79°C | 45°C | 1200:1 | More than 10000 hrs |
| ⑧ | ○ | × | ○ | ○ | 79°C | 44°C | 1800:1 | More than 10000 hrs |

※ Values in row 3 through 8 are calculated from the temperature and light intensity involved.

LCD APPARATUS

FIELD OF THE INVENTION

This invention relates to a projection type liquid crystal display (LCD) apparatus, and more particularly, to an LCD unit.

BACKGROUND OF THE INVENTION

Lifetime of LCD panels and polarizers has become an important factor in recent years as they are used in LCD units operated at higher brightness and higher contrast. Particularly, since films of polarizers are exposed to intense short wavelength light in the blue band, they are often burnt by the light. To cope with this problem, inorganic polarizers have been developed. A typical inorganic polarizer is a wire-grid type polarizer, MOXTEK, manufactured by MOXTEC Inc. This polarizer is a so-called reflective polarizer, which allows transmission of light that is polarized in a particular direction but reflects the rest of the light. As a consequence, the polarizer suffers little time degradation due to irradiation of light and is often used in a projection type LCD, particularly a rear projection TV requiring a long lifetime.

However, reflective inorganic polarizers have a disadvantage that they have a lower polarization degree than conventional absorptive organic polarizers (for example, dye-polarizers). To overcome the disadvantage, a reflective inorganic polarizer is coupled with a phase retardation plate, called an optical compensator, to enhance the contrast of a displayed image.

There is disclosed in Japanese Patent Application Laid Open No. 2000-356770 an LCD panel having on the light-incidence side thereof an absorptive polarizer, which is provided on the light-incidence side thereof with a reflective polarizer.

However, as compared with conventional absorptive organic polarization films, such a reflective inorganic polarizer as mentioned above causes (1) degradation of contrast, (2) repetitive or multiple reflections of unwanted components of light between a thin metallic layer incorporated in the LCD panel to form a black matrix of the LCD panel and the reflective inorganic polarizer, which reflection in turn causes light to partly enter the reflective inorganic polarizer and results in several irregular linear patterns on the display screen. These factors deteriorate the picture quality of a displayed image. Particularly, when an optical compensator is provided on the light-incidence side of an LCD panel to enhance the contrast of a displayed image, a linearly polarized beam of light is partly depolarized into a beam of elliptically polarized light, which includes two linearly polarized lights oscillating in two perpendicular directions. Together with the multiple reflections, this elliptical polarization significantly degrades the picture quality.

SUMMARY OF THE INVENTION

In view of the above mentioned drawbacks of prior art LCD panels, it is an object of the present invention to provide an LCD apparatus having an LCD panel that is not affected by contrast loss of images due to deficiency of polarization degree of the reflective polarizer of the panel and free of picture quality degradation due to unwanted multiple reflections of light by the polarizer.

In accordance with one aspect of the invention, there is provided an LCD display apparatus having:

LCD panels adapted to modulate irradiated light by picture signals, a projection lens for projecting the light modulated by the LCD panels, and a light source for emitting light to irradiate the LCD panels, said LCD display apparatus characterized by:

a reflective polarizer arranged on each light-incidence side of said LCD panels;

an optical compensator for reducing the birefringence that takes place in a liquid crystal, said optical compensator arranged between said reflective polarizer and LCD panel; and an absorptive polarizer arranged between said reflective polarizer and optical compensator such that the light transmission axes of said reflective polarizer and absorptive polarizer coincide with each other.

In this arrangement, a cooperative action of the absorptive polarizer and optical compensator reduces the contrast loss of a displayed image due to deficiency of polarization degree of the reflective polarization. At the same time, cooperative action of the absorptive polarizer absorbing unwanted multiple reflective light and the absorptive optical compensator reducing irregular black display patterns together prevents deterioration of the picture quality.

Further, the heat resistance of the reflective polarizer will be improved if it is formed of inorganic materials.

The absorptive polarizer preferably has a lower polarization degree than the reflective polarizer.

Thus, the heat generated by unwanted polarization light absorbed by the absorptive correction plate is suppressed as much as possible to eliminate a major source of deterioration of the polarizer, i.e. a rise in temperature of the polarizer.

The reflective polarizer and the absorptive polarizer are preferably arranged such that they can be each adjustably rotated in a plane perpendicular to the optical axis.

As a consequence, should the light transmission axes of the reflective polarizer and the absorptive polarizer be misaligned, the axes could be perfectly aligned (i.e. coincided with each other) by rotating the plates for a better contrast.

Alternatively, either one of the reflective polarizer or the absorptive polarizer can be adjustably rotated in the plane perpendicular to the optical axis, which provides the same alignment effect as in the foregoing example.

The optical compensator is preferably set rotatable in the plane perpendicular to the optical axis.

Thus, uniformity in luminosity of the LCD panel, especially, the uniformity of the blackness of the LCD panel, is markedly improved.

BRIEF DESCRIPTION OF THE DRAWINGS

FIG. 3 is table summarizing the results of experiments performed on different LCD panels.

DETAILED DESCRIPTION OF THE PREFERRED EMBODIMENT

Figure 1:
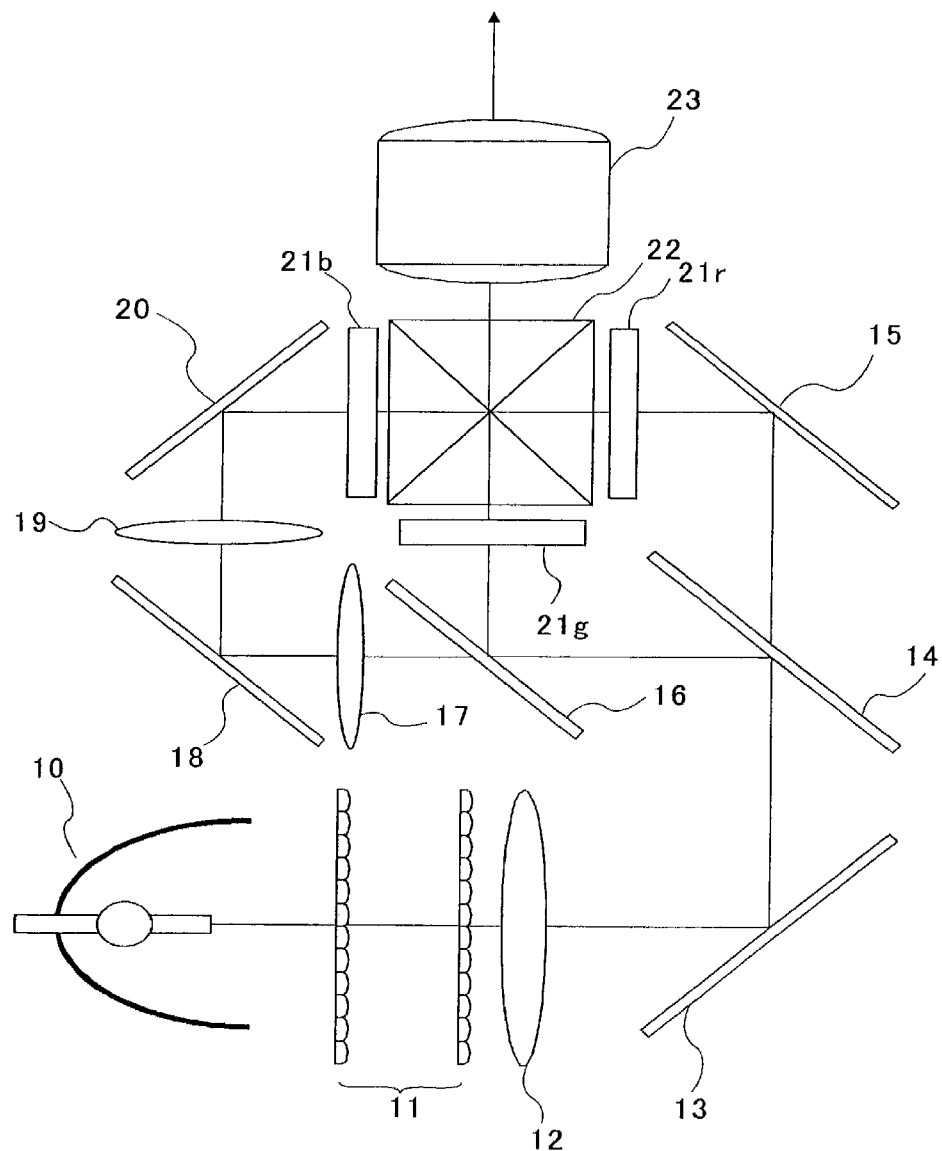
FIG. 1 is a plan view showing an optical system of a 3-panel type liquid crystal projector in accordance with one embodiment of the invention.

The invention will now be described in detail by way of example with reference to the accompanying drawings. FIG. 1 is a plan view showing the optical system of a 3-panel type liquid crystal projector in accordance with one embodiment of the invention.

A beam of white light emitted from a light source 10 such as a metal halide lamp passes through an integrator lens 11 and a condenser 12. The beam is then deflected by a total reflection mirror 13 through an angle of 90 degrees and impinges on the first dichroic mirror 14. The integrator lens 11 consists of a pair of lens which are each designed to cause non-uniform luminous light emitted from the light source 10 to uniformly irradiate light over the entire surface of the LCD panel. That is, the variations in the luminosity over the central and peripheral regions of the LCD panel would be reduced.

The first dichroic mirror 14 allows transmission of light in the red wavelength region, and reflects light in the cyanogen (green+blue) wavelength region. The light in the red wavelength region that has passed through the first dichroic mirror 14 is reflected by a total reflection mirror 15 to an LCD unit 21r comprising a transmission type LCD panel for red light and a polarizer, where the light is modulated by a first picture signal.

On the other hand, the light in the cyanogens wavelength region, reflected by the first dichroic mirror 14, is led to a second dichroic mirror 16. The second dichroic mirror 16 transmits the light in the blue wavelength region, and reflects light in the green wavelength region. The light in the green wavelength region, reflected by the second dichroic mirror 16, is led to an LCD unit 21g comprising a transmission type liquid crystal panel and a polarizer for green light, where the light is modulated by a second picture signal.

Via relay lenses 17 and 19 and total reflection mirrors 18 and 20, The light in the blue wavelength region that has passes through the second dichroic mirror 16 is led to an LCD unit 21b comprising a transmission type LCD panel and a polarizer for blue light, where the light is modulated by a third picture signal.

The colored beams of modulated light from the respective LCD units 21r, 21g, and 21b are compounded by a dichroic prism 22 into a beam of colored image light. The resultant image light is projected by a projection lens 23 onto a screen (not shown).

Figure 2A:
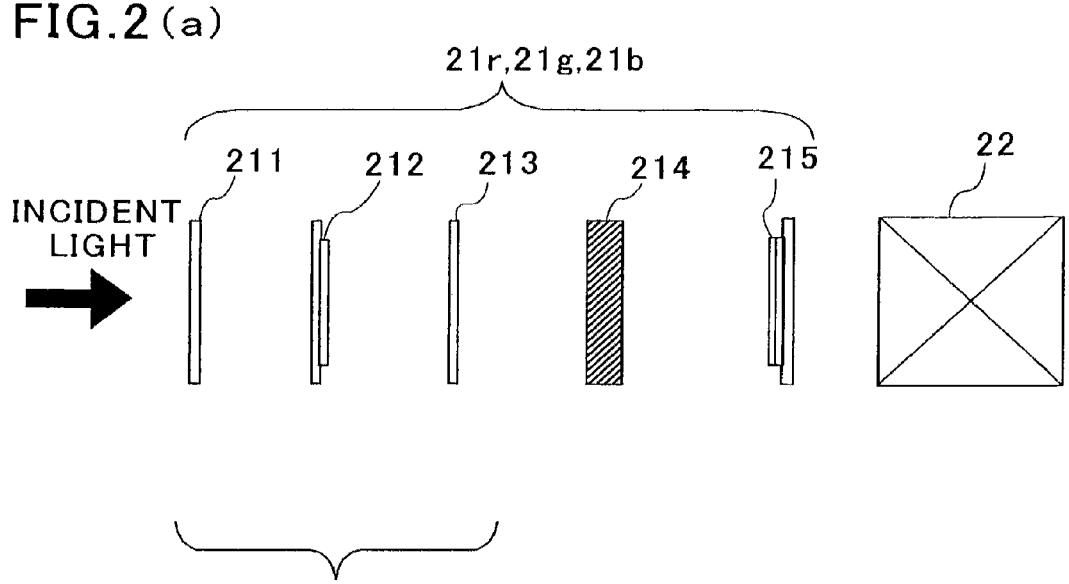
FIG. 2(a) is a schematic diagram showing an arrangement of the LCD unit for use in the optical system of FIG. 1.
Figure 2B:
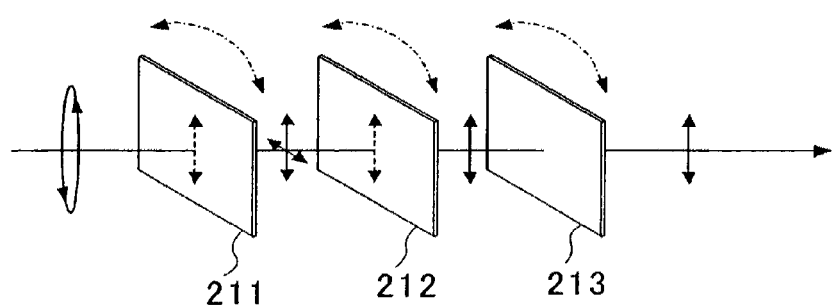
FIG. 2(b) is a schematic diagram showing a beam of light undergoing polarization while traveling from a reflective polarizer to an LCD panel via an absorptive polarizer and an optical compensators.

FIG. 2(a) shows an arrangement of the LCD units 21r, 21g, and 21b, and FIG. 2(b) shows how light is polarized while passing through a reflective polarizer, an absorptive polarizer, and an optical compensator before reaching one of the LCD panels. Solid arrows in FIG. 2(b) represent the directions of polarization of incident light, and broken arrows represent the directions of light transmission axes of the polarizers.

As shown in FIG. 2(a), each of the LCD units 21r, 21g, and 21b has a light-incidence side reflective polarizer 211, an absorptive polarizer 212, an optical compensator 213, an LCD panel 214 that comprised of an enclosed liquid crystal between a pair of glass substrates (having picture electrodes and orientation films), and a light-exiting side polarizer 215.

The reflective polarizer 211 can allow the component of incident light to pass through it if it has an oscillatory direction parallel to the light transmission axis of the plate 211, but otherwise mostly reflects the (unwanted) component oscillating in the direction perpendicular to the transmission axis. The reflective (inorganic) polarizer 211 is employed to extend the lifetime of the absorptive polarizer 212. It can be of any type, including wire-grid type or photonic crystal type.

On the other hand, the absorptive polarizer 212 is employed to correct (i.e. enhance) the contrast of, and to improve the picture quality of, a displayed image by absorbing unwanted catoptric light while transmitting required light. In this case, the polarization degree of the absorptive polarizer 212 should be lowered than that of the reflective polarizer 211 to suppress the heat generated through absorption of unwanted polarization components as much as possible, This can be done by controlling the amount of dye in, for example, the absorptive polarizer 212. That is, in order to prevent temperature rise in the absorptive polarizer 212 that can be a cause of degradation thereof, an absorptive polarizer 212 having a lower polarization degree than the reflective polarizer 211 is used. The lower the polarization degree, the less the absorption of light by dye is, and so is the temperature rise in the polarizer 212. An inorganic polarizer made of a glass containing dispersed minute metallic particulates may be used as the low-absorptive polarizer.

The optical compensator 213 is provided to reduce the birefringence in the liquid crystal of an LCD unit to thereby enhance the contrast of a displayed image and eliminate irregularity in the blackness of the LCD unit.

It is noted that the light transmission axes of the reflective polarizer 211 and the absorptive polarizer 212 are coincided with each other, so that the both polarizers are set up in parallel to each other. If these light transmission axes are misaligned, satisfactory display performance cannot be obtained. Correct alignment can be obtained by properly rotating one or both of the polarizer(s) in the directions indicated by dotted arrows as shown in FIG. 2(b), using a rotational adjustment mechanism (not shown in the second embodiment described below). As an example of the reflective polarizer 211, a wire-grid type inorganic polarizer is used in this embodiment. The light reflected by the reflective polarizer 211 will be directed backward to the light source.

Referring to FIG. 2(b), it is seen that, of the components of the elliptically polarized light incident to the reflective polarizer 211 at right angle, the linearly polarized component having oscillation in the direction parallel to the light transmission axis of the polarizer 211 passes through the plate 211, while the component having oscillation in the direction perpendicular to the axis is mostly reflected. Since the reflective polarizer 211 mostly reflects unwanted component of light, temperature rise in the plate 211 itself due to absorption of light is insignificant.

Although a good polarization degree of light cannot be anticipated using only the reflective polarizer 211 as discussed above, it can be anticipated with the linearly polarized light that has passed through the reflective and the absorptive polarizer 212, which enables a good contrast in the resultant image. It should be appreciated that the absorptive polarizer 212 absorbs only a negligibly small amount of light since most of the component oscillating in the direction perpendicular to the light transmission axis has been already reflected by the reflective polarizer 211. That is, most of the light entering the absorptive polarizer 212 passes through the absorptive polarizer 212 if the intensity of the incidence light is increased, so that only little light is absorbed by the polarizer 212. As a result, the rise in temperature of the absorptive polarizer 212 is significantly suppressed in comparison with a conventional absorptive polarizer.

The results of our experiments will now be discussed below with reference to FIG. 3. Open circles indicate use of samples, and crosses indicate non-use of the samples. Row number 8 refers to a sample (referred to as Sample 8) in accordance with the first embodiment of the invention. Row numbers 1 through 7 (hereinafter referred to as Sample 1 through 7) refer to comparative conventional samples.

It is seen from Sample 1 that the contrast ratio is about 900:1 and that the surface temperature of the (organic) polarizer becomes about 71° C. if only a conventional absorptive polarizer is used. When an LCD unit having this polarizer was continuously used in a projection type LCD apparatus, it got burned in about 3000 hours. Next, when a wire-grid type reflective polarizer of Sample 3 was used instead of an absorptive polarizer, the contrast ratio dropped to about 760:1, and the temperature of the (inorganic) surface layer of the polarizer became about 78° C., but no burning was observed even after 10,000 hours. This shows that the reflective inorganic polarizer excels in heat resistance.

Figure 4:
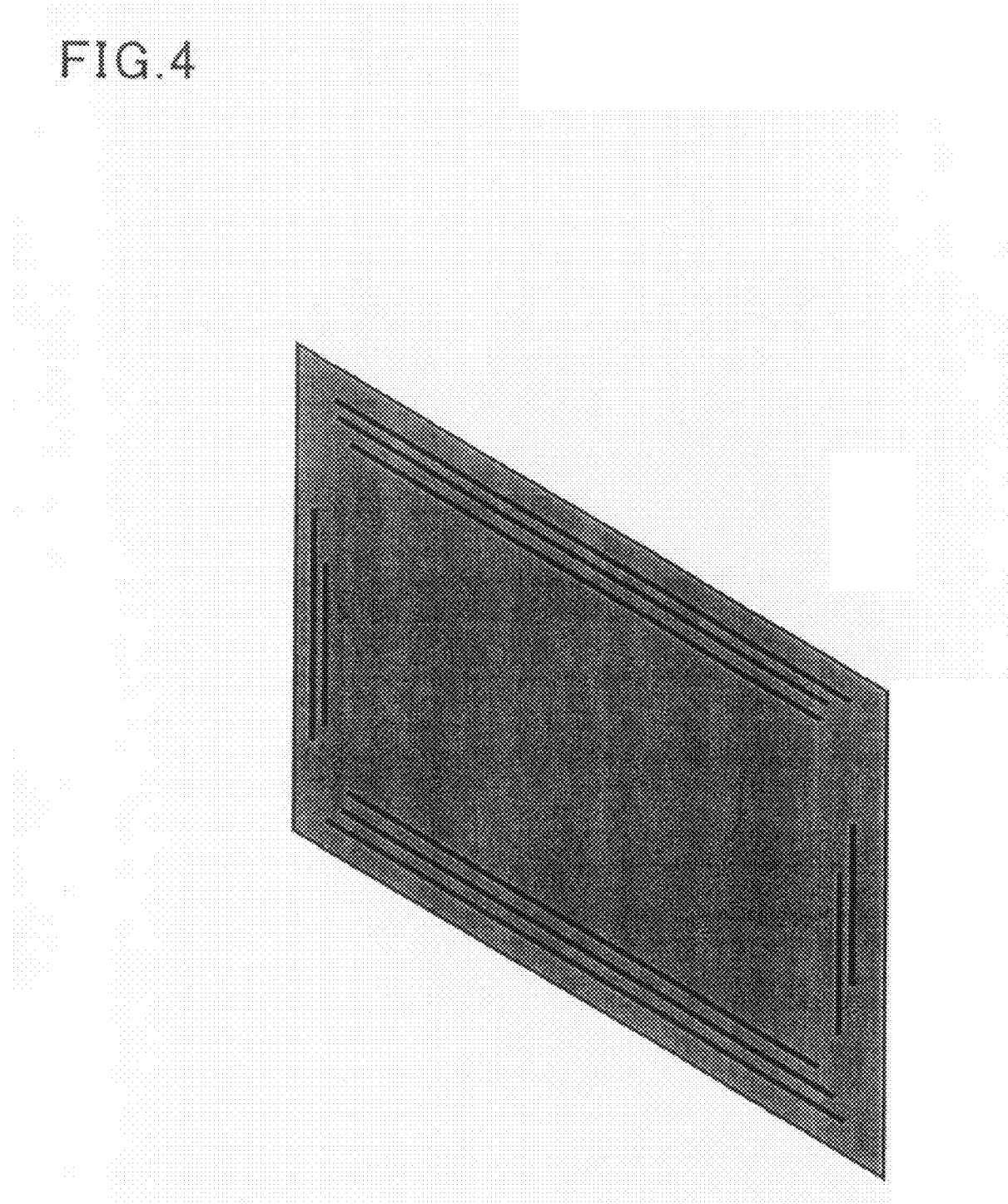
FIG. 4 illustrates irregular linear patterns appearing on the display screen due to multiple reflections of light within an optical system.

As shown in row 4, if an optical compensator is inserted between the wire-grid type reflective polarizer and the LCD panel, the contrast ratio is improved to about 1160:1. In this case, however, irregular linear patterns appear on the black display screen, as shown in FIG. 4, where the black display screen is shown in gray and irregular linear patterns are shown in black in FIG. 4 to clearly depict regions of the screen where irregular linear patterns appear.

On the other hand, it is seen from Sample 8 of the first embodiment of the invention, in which the absorptive polarizer 212 having a lower polarization degree than a reflective polarizer 211 is inserted between the wire-grid type reflective polarizer 211 and the optical compensator 213 and the optical axes are aligned without using no rotational adjustment mechanism, that (1) the temperature of the (organic) surface of the polarizer is reduced to about 44° C.;

(2) the absorptive polarizer can be used without burning for more than 10,000 hours in an LCD unit;

(3) irregular linear patterns are perfectly eliminated; and (4) the contrast ratio is improved to about 1600:1.

It is noted that, like Sample 8 of the invention, Sample 6 also incorporates a reflective polarizer, an absorptive polarizer, and an optical compensator, but its absorptive polarizer has an extinction ratio of 60000:1 in contrast to the ratio 20:1 of the Sample 8. Therefore, although Sample 6 has a higher contrast ratio, the surface temperature of the absorptive polarizer is 61° C., as compared with 44° C. of Sample 8. As a consequence, non-burning time of Sample 6 reduces to one half of the non-burning time of Sample 8 in the calculation.

Next, a second embodiment of the invention will be described below. In this embodiment, each of the wire-grid type reflective polarizer 211, absorptive polarizer 212, and optical compensator 213 of Sample 8 is mounted rotatable in a plane perpendicular to their common optical axis (which is perpendicular to the LCD panel 215).

By properly rotating the wire-grid type reflective polarizer 211 and absorptive polarizer 212, the contrast ratio of the polarizers improves to about 1660:1. The improvement is attributed to the perfect alignment of the light transmission axes of the wire-grid type reflective polarizer 211 and absorptive polarizer 212 by the rotation.

By further adjusting the rotational position of the optical compensator 213, the uniformity in luminosity of the display screen is improved. Particularly, the uniformity of the black screen is greatly improved. Specifically, the values of CIE chromaticity coordinate (x, y) indicative of the uniformity of a screen is improved from a pre-adjustment value of (0.042, 0.076) to a post-adjustment value of (0.026, 0.044).

Instead of rotating both of the reflective polarizer 211 and absorptive polarizer 212, substantially the same result can be obtained by solely rotating one of them.

It is noted that the optical compensator can be mounted at an angle relative to the optical axis, as disclosed in the Japanese Patent Application Laid Open No. 2006-39087. Moreover, the optical compensator is not limited to the incidence side of an LCD panel. For example, a further optical compensator can be separately mounted on the light-exiting side of the panel as well. The absorptive polarizers are not necessarily mounted on the respective LCD units 21r, 21g, and 21b. Only one polarizer can be mounted on one of the three LCD units.

The optical system is not limited to the one shown in FIG. 1. Rather, a different type of optical system can be used in the invention.

It is also noted that any type of LCD panels can be used in the invention, including TN (Twisted Nematic) type, VA (Vertically Aligned) type, IPS (In-Plane-Switching) type, NW (Normally White) mode type, and NB (Normally Black) mode type LCD panels.

The invention claimed is:

1. An LCD apparatus, comprising:
a plurality of LCD panels adapted to modulate irradiated light by picture signals;
a projection lens for projecting said light modulated by said LCD panels; and
a light source for emitting light to irradiate said LCD panels wherein each of said LCD panels includes,
a reflective polarizer disposed on each light-incidence side of each one of said LCD panels;
an optical compensator for reducing the birefringence that takes place in the liquid crystal of the LCD panel, said optical compensator being disposed between said reflective polarizer and the LCD panel associated therewith; and
an absorptive polarizer arranged between said reflective polarizer and optical compensator such that the light transmission axes of said reflective polarizer and absorptive polarizer coincide with each other, said absorptive polarizer having a lower degree of polarization than said reflective polarizer.

2. The LCD apparatus according to claim 1, wherein said reflective polarizer consists of inorganic materials.

3. The LCD apparatus according to claim 1, wherein said reflective polarizer and absorptive polarizer are respectively rotatable in planes perpendicular to the common optical axis thereof.

4. The LCD apparatus according to claim 1, wherein either one of said reflective polarizer or absorptive polarizer is rotatable in the plane perpendicular to the optical axis thereof.

5. The LCD apparatus according to claim 1, wherein said optical compensator is rotatable in a plane perpendicular to the optical axis thereof.

6. The LCD apparatus according to claim 3, wherein said optical compensator is rotatable in a plane perpendicular to the optical axis thereof.

7. The LCD apparatus according to claim 4, wherein said optical compensator is rotatable in a plane perpendicular to the optical axis thereof.

* * * * *